United States Patent
Wang

(10) Patent No.: US 11,144,611 B2
(45) Date of Patent: Oct. 12, 2021

(54) DATA PROCESSING METHOD AND APPARATUS

(71) Applicant: TENCENT TECHNOLOGY (SHENZHEN) COMPANY LIMITED, Shenzhen (CN)

(72) Inventor: Yao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 611 days.

(21) Appl. No.: 14/790,495

(22) Filed: Jul. 2, 2015

(65) Prior Publication Data
US 2015/0302106 A1    Oct. 22, 2015

Related U.S. Application Data

(63) Continuation of application No. PCT/CN2014/070137, filed on Jan. 6, 2014.

(30) Foreign Application Priority Data

Jan. 6, 2013    (CN) .......................... 201310003705.4

(51) Int. Cl.
G06F 16/955    (2019.01)
G06F 16/958    (2019.01)

(52) U.S. Cl.
CPC .......... *G06F 16/955* (2019.01); *G06F 16/958* (2019.01)

(58) Field of Classification Search
CPC ......... G06F 17/30905; G06F 17/30864; G06F 16/955; G06F 16/958
See application file for complete search history.

(56) References Cited

U.S. PATENT DOCUMENTS

2006/0004914 A1 *    1/2006    Kelly .................... G06Q 30/00
                                                                          709/219
2006/0218111 A1    9/2006    Cohen
(Continued)

FOREIGN PATENT DOCUMENTS

CN    101930456 A    12/2010
CN    101981590 A    2/2011
(Continued)

OTHER PUBLICATIONS

Chinese Office Action for Application No. 201310003705.4 dated Sep. 1, 2017, and an English concise explanation of relevance thereof.
(Continued)

*Primary Examiner* — Vaishali Shah
(74) *Attorney, Agent, or Firm* — Sughrue Mion, PLLC

(57) ABSTRACT

A data processing method and apparatus are described. The method includes receiving a request which carries a user identifier (ID) from a user terminal. The method also includes determining all associated user IDs associated with the user ID. The method also includes selecting N particular user IDs which meet a set condition from all the associated user IDs, pulling latest user data corresponding to the N particular user IDs, and returning the latest user data corresponding to the N particular user IDs to the user terminal. Wherein N is smaller than or equal to a user data amount M requested by a page.

11 Claims, 5 Drawing Sheets

(56) References Cited

U.S. PATENT DOCUMENTS

| | | | |
|---|---|---|---|
| 2007/0217422 A1* | 9/2007 | Mawatari | H04L 43/10 370/392 |
| 2009/0249451 A1 | 10/2009 | Su et al. | |
| 2013/0019181 A1* | 1/2013 | Kitamorn | G06Q 50/01 715/736 |
| 2013/0125060 A1* | 5/2013 | Lee | G06F 3/048 715/853 |
| 2013/0191416 A1* | 7/2013 | Lee | G06F 16/24534 707/771 |
| 2014/0068465 A1 | 3/2014 | Zhang et al. | |
| 2014/0189046 A1* | 7/2014 | Vezzuto | H04L 67/108 709/217 |

FOREIGN PATENT DOCUMENTS

| | | | | |
|---|---|---|---|---|
| CN | 102387182 | * | 3/2012 | G06F 17/30 |
| CN | 102387182 A | | 3/2012 | |
| CN | 102446193 A | | 5/2012 | |
| CN | 102769579 A | | 11/2012 | |
| CN | 102831227 A | | 12/2012 | |
| WO | 20121068561 A2 | | 5/2012 | |
| WO | 20141106482 A1 | | 7/2014 | |

OTHER PUBLICATIONS

International Preliminary Report for Application No. PCT/CN2014/070137 dated Jul. 16, 2015.

* cited by examiner

US 11,144,611 B2

DATA PROCESSING METHOD AND APPARATUS

CROSS-REFERENCE TO RELATED APPLICATIONS

This application is a continuation of International Application No. PCT/CN2014/070137, filed Jan. 6, 2014. This application claims the benefit and priority of Chinese Application No. 201310003705.4, filed Jan. 6, 2013. The entire disclosures of each of the above applications are incorporated herein by reference.

FIELD

The present disclosure relates to a data processing method and apparatus.

BACKGROUND

This section provides background information related to the present disclosure which is not necessarily prior art.

With Internet technology, user generated content (UGC) is a different manner in which a user uses the internet. Compared with the previous method of mainly focusing on download, UGC focuses on both downloads and uploads equally. Presently, community network, video sharing, and microblogging are the main application forms of UGC. Taking the microblogging as an example, an existing processing manner of microblogging will be described hereinafter.

A microblogging user at most has 2000 listening users. For the convenience of description, the listening users are referred to as idols (Uins). A microblogging home page corresponding to a microblogging user can display at most 70 pieces of microblogging messages in accordance with a time order. One piece of microblogging message is corresponding to one microblogging user, that is, the 70 pieces of microblogging messages displayed in the microblogging home page corresponding to the microblogging user are published by at most 70 Uins.

SUMMARY

This section provides a general summary of the disclosure, and is not a comprehensive disclosure of its full scope or all of its features.

Various embodiments of the present disclosure provide a data processing method and apparatus, which can save data transmission bandwidth resources during a page request.

A data processing method includes:
receiving a request which carries a user identifier (ID) from a user terminal;
determining all associated user IDs associated with the user ID; and
selecting N particular user IDs which meet a set condition from all the associated user IDs, pulling latest user data corresponding to the N particular user IDs, and returning the latest user data corresponding to the N particular user IDs to the user terminal, wherein N is smaller than or equal to a user data amount M requested by a page.

A data processing apparatus includes a receiving module, a determining module, and a processing module, wherein:
the receiving module is configured to receive a request which carries a user identifier (ID) from a user terminal;
the determining module is configured to determine all associated user IDs associated with the user ID;
the processing module comprises a selecting unit and a data processing unit;
the selecting unit is configured to select N particular user IDs which meet a set condition from all the associated user IDs determined by the determining module;
the data processing unit is configured to pull latest user data corresponding to the N particular user IDs and return the latest user data corresponding to the N particular user IDs to the user terminal, wherein N is smaller than or equal to a user data amount M requested by a page.

A data processing apparatus includes a processor and a memory, wherein the processor and the memory are connected with each other via an internal bus. the memory stores a set of instructions for performing a data processing method, where the set of instructions direct the processor to perform acts of:
receiving a request from a user terminal, wherein the request carries a user identifier (ID) and a user data amount M requested by a page;
determining all associated user IDs associated with the user ID; and
selecting N particular user IDs which meet a set condition from all the associated user IDs, pulling the latest user data corresponding to the N particular user IDs and returning the latest user data corresponding to the N particular user IDs to the user terminal, wherein N is smaller than or equal to M.

It can be seen from the above that when receiving the request from the user terminal, selecting N particular user IDs which meet the set condition from all the associated user IDs associated with the user, pulling latest user data corresponding to the N particular user IDs, and returning the latest user data corresponding to the N particular user IDs to the user terminal, N being smaller than or equal to the user data amount M requested by the page, compared with pulling latest user data corresponding to all the associated user IDs associated with the user, can save bandwidth resources and costs.

Further areas of applicability will become apparent from the description provided herein. The description and examples in this summary are intended for purposes of illustration and are not intended to limit the scope of the present disclosure.

DRAWINGS

The drawings described herein are for illustrative purposes of various embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

For simplicity and illustrative purposes, the present disclosure is described by referring mainly to various examples thereof. In the following description, numerous details are set forth in order to provide a thorough understanding of the present disclosure. It will be readily apparent however, that the present disclosure may be practiced without limitation to these details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

Figure 1:
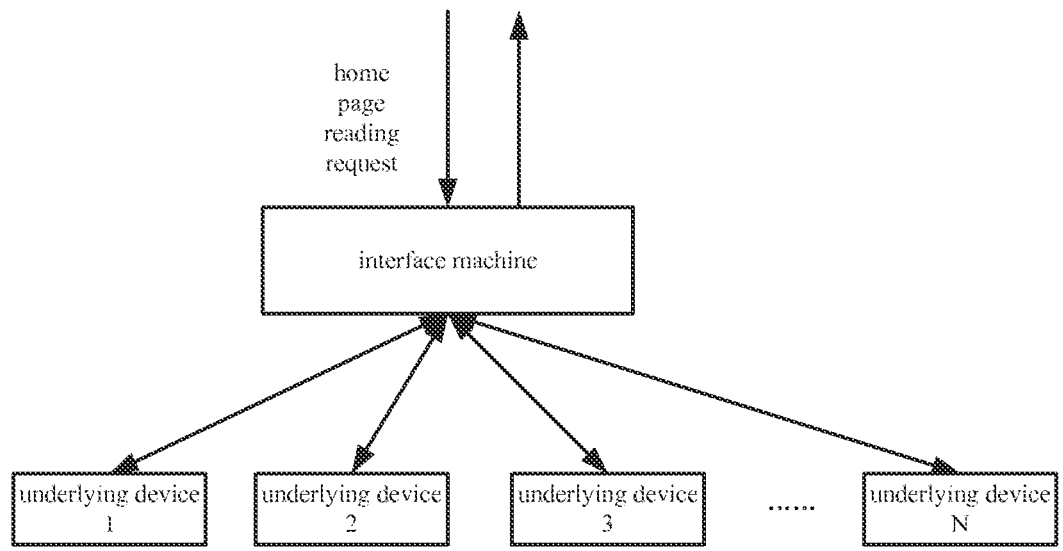
FIG. 1 shows a diagram of a microblogging message processing architecture according to various embodiments.

FIG. 1 shows a diagram of a microblogging message processing architecture. Microblogging messages published by microblogging users are discretely distributed in underlying devices (referred to as underlying svr). For example, in FIG. 1, an underlying device 1 is responsible for microblogging messages published by microblogging users numbered from 1 to 1000. An underlying device 2 is responsible for microblogging messages published by microblogging users numbered from 1001 to 2000. An underlying device 3 is responsible for microblogging messages published by microblogging users numbered from 2001 to 3000, and so on until an underlying device N.

Figure 2:
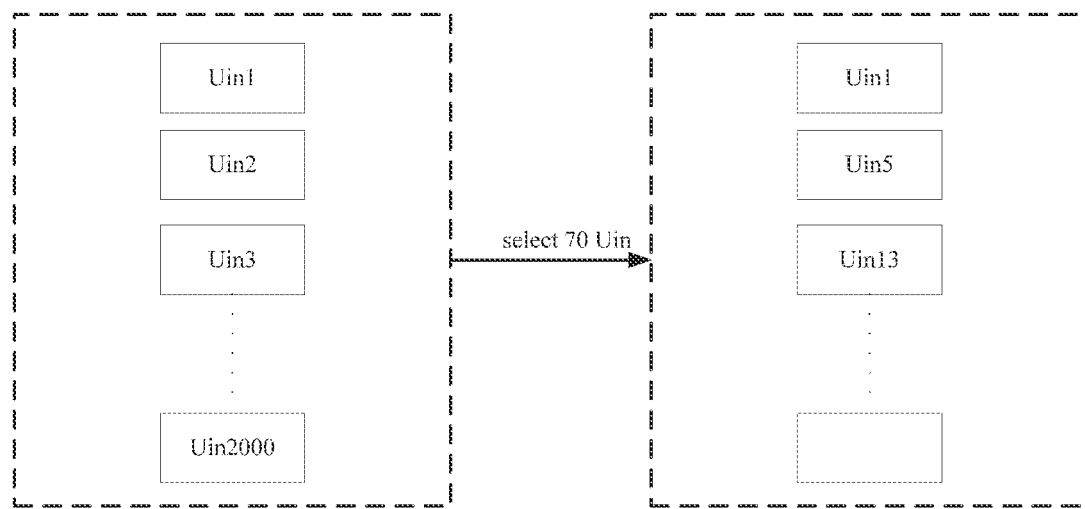
FIG. 2 is a diagram showing processing microblogging messages for a microblogging home page according to various embodiments.

When a microblogging home page corresponding to a microblogging user numbered 1 needs to display microblogging messages, the microblogging user sends a home page reading request to an interface machine connected with the underlying devices through a client terminal. After the interface machine receives the home page reading request, the interface machine finds out 2000 Uins corresponding to the microblogging user numbered 1, and then sends the home page reading request to the underlying devices which are responsible for microblogging messages published by the 2000 Uins, respectively. After receiving the home page reading request, the underlying devices return a microblogging message published by each microblogging user of the 2000 Uins for which the underlying devices are responsible to the interface machine. After the interface machine receives the microblogging messages published by the 2000 Uins returned by the underlying devices, the interface machine arranges the microblogging messages published by the 2000 Uins in a descending order according to microblogging message publish time and selects and returns microblogging messages published by the first 70 idols to the microblogging home page for displaying, as shown in FIG. 2.

In the above process of microblogging message processing, in order to display the 70 pieces of microblogging messages on the microblogging home page, it needs to obtain the microblogging messages published by the 2000 Uins and select the latest 70 pieces of microblogging messages for displaying by traversing the microblogging messages published by the 2000 Uins. The remaining 1930 pieces of microblogging messages are not displayed, that is, obtaining the remaining 1930 pieces of microblogging messages is useless. However, obtaining the remaining 1930 pieces of microblogging messages needs bandwidth resources, which will waste many bandwidth resources.

Figure 3:
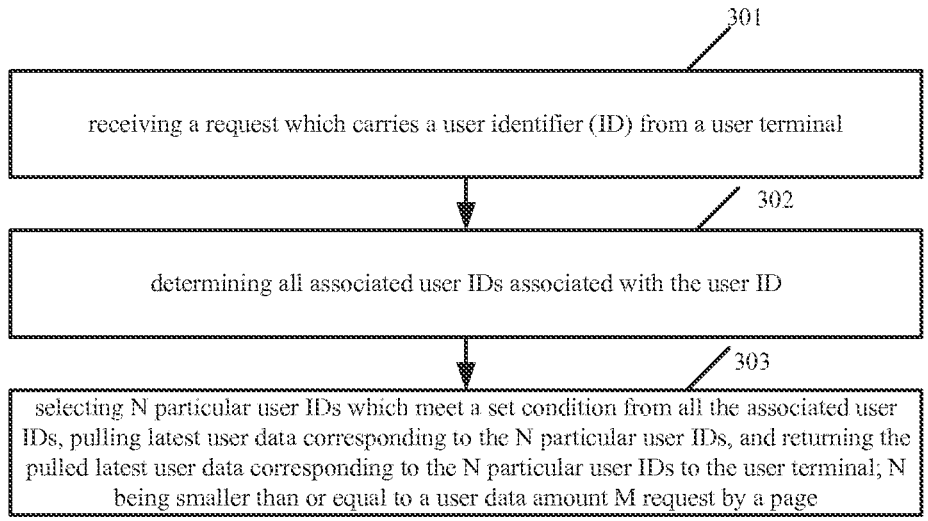
FIG. 3 is a flow chart of a data processing method according to various embodiments.

FIG. 3 is a flow chart of a data processing method according to various embodiments of the present disclosure. As shown in FIG. 3, the data processing method can include the following blocks.

Block 301: Receiving a request which carries a user identifier (ID) from a user terminal. Taking a microblogging application as an example, for any one microblogging user terminal, the microblogging user terminal needs to send the request to a server before displaying a microblogging home page, so as to obtain user data needed to be displayed from the server. In order to facilitate the microblogging user terminal to obtain the user data needed to be displayed, the user ID corresponding to the microblogging user terminal is generally carried in the sent request.

Block 302: Determining all associated user IDs associated with the user ID. In the present disclosure, a relationship chain of each user ID can be preset in advance. The relationship chain marks all user IDs associated with the user ID. Still taking the microblogging application as an example, one microblogging user ID usually has, at most, 2000 associated listening user IDs. Based on this, when setting a relationship chain of one microblogging user ID in the present disclosure, the 2000 listening user IDs of the microblogging user ID can be set into the relationship chain of the microblogging user ID as associated users of the microblogging user ID.

Based on the description of presetting the relationship chain of each user ID, after receiving the request, block 302 can further include, according to the user ID carried in the request, finding a relationship chain corresponding to the user ID from the preset relationship chains and taking all user IDs marked in the relationship chain as all user IDs associated with the user ID carried in the request (recorded as associated user IDs).

Block 303: Selecting N particular user IDs which meet a set condition from all the associated user IDs, pulling latest user data corresponding to the N particular user IDs, and returning the latest user data corresponding to the N particular user IDs to the user terminal, N being smaller than or equal to a user data amount M requested by a page.

Here, the term "pulling" refers to "obtaining", for example, "pulling latest user data" refers to "obtaining latest user data". Still taking the microblogging application as an example, one microblogging page can display, at most, 70 pieces of microblogging messages, but the microblogging user ID has at most 2000 associated user IDs. In block 303, by presetting the condition, selecting N such as equal to 70 or less than 70 particular user IDs which meet the set condition from the 2000 associated user IDs and pulling the latest user data corresponding to the N particular user IDs, rather than pulling latest user data corresponding to all the 2000 associated user IDs, can reduce the amount of user data and save bandwidth resources.

Figure 4:
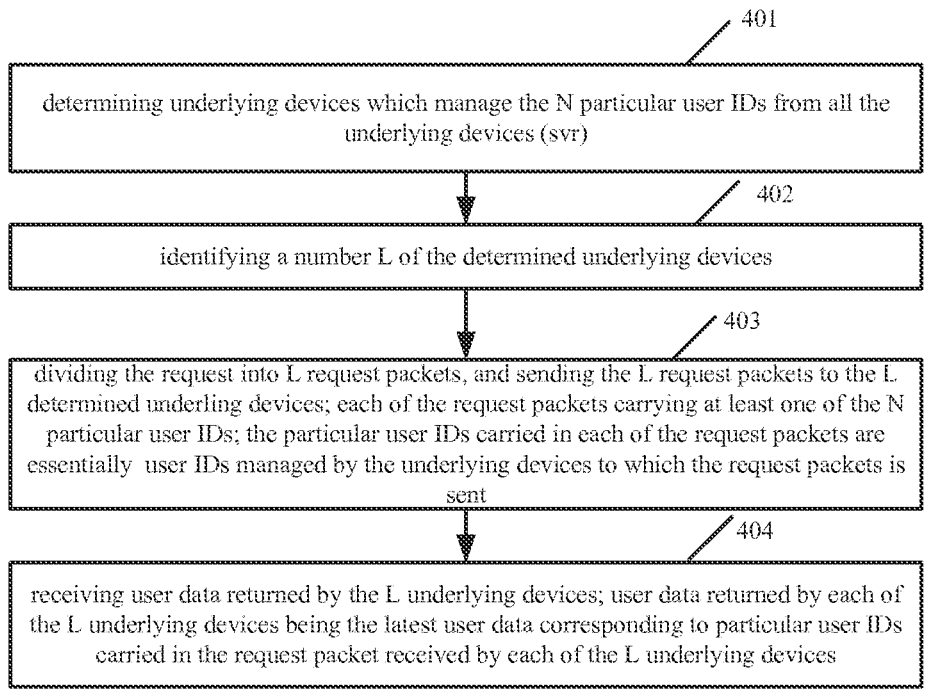
FIG. 4 is an implementation flow chart of pulling user data according to various embodiments.

The process shown in FIG. 3 is completed. In the present disclosure, according to various embodiments, in block 303, pulling the latest user data corresponding to the N particular user IDs is completed through a process as shown in FIG. 4. FIG. 4 is an implementation flow chart of pulling user data according to various embodiments of the present disclosure. As shown in FIG. 4, the process can include the following blocks.

Block 401: Determining underlying devices which manage the N particular user IDs from all the underlying devices (svr). Usually, each user ID and all user data of each user ID are managed by one underlying device. The amount of the underlying devices can be set when networking and this will not be repeated here.

Block 402: Identifying a number L of the determined underlying devices.

Block 403: Dividing the request into L request packets and sending the L request packets to the L determined underling devices, each of the request packets carrying at least one of the N particular user IDs. The particular user IDs carried in each of the request packets are essentially user IDs managed by the underlying devices to which the request packets is sent.

Taking a value of N to be 70 as an example, if the L identified in block 402 is 3, 30 user IDs of the 70 user IDs are managed by the underlying device 1, 30 user IDs of the 70 user IDs are managed by the underlying device 2, and the remaining 10 user IDs are managed by the underlying device 3. In block 403, the request received in the above block 301 can then be divided into following 3 request packets, including a request packet 1, a request packet 2, and a request packet 3. The request packet 1 carries the 30 user IDs which are managed by the underlying device 1 and is sent to the underlying device 1, the request packet 2 carries the 30 user IDs which are managed by the underlying device 2 and is sent to the underlying device 2, and the request packet 3 carries the 10 user IDs which are managed by the underlying device 3 and is sent to the underlying device 3.

Block 404: Receiving user data returned by the L underlying devices, user data returned by each of the L underlying devices being the latest user data corresponding to particular user IDs carried in the request packet received by each of the L underlying devices.

The latest user data corresponding to the N particular user IDs can be pulled through the process as shown in FIG. 4. Still taking the microblogging application as an example, a microblogging home page of one microblogging user ID can display, at most, 70 pieces of microblogging messages, but the microblogging user ID has at most 2000 associated user IDs. Through the process as shown in FIG. 4, N such as equal to 70 or less than 70 user IDs which meet the set condition are selected from the 2000 user IDs and the request packets are sent to the underlying devices which are responsible for managing the N user ID, rather than to all the underlying devices, which are responsible for managing the 2000 user IDs. This can reduce the load of the underlying devices, reduce the amount of the sent request packets, save the expensive bandwidth resources, save the cost of the underlying device, and cause the underlying devices to not require expansion for an extended period of time.

Figure 5:
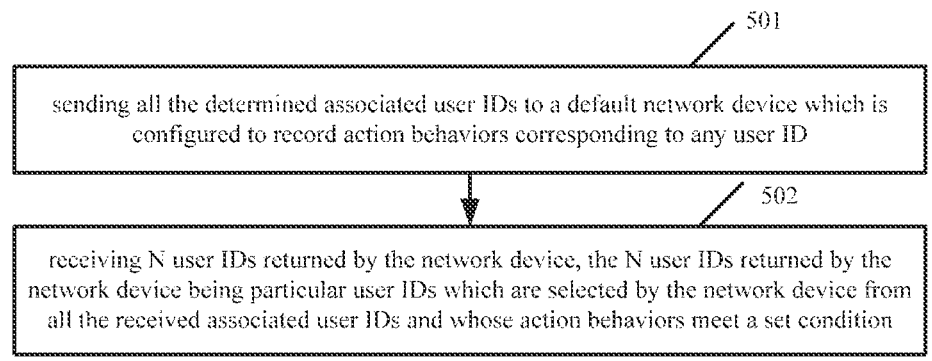
FIG. 5 is a flow chart of selecting user IDs according to various embodiments.

Further, in the present disclosure, according to various embodiments, in the above block 303, selecting N particular user IDs which meet a set condition from all the determined associated user IDs can include a process as shown in FIG. 5. FIG. 5 is a flow chart of selecting user IDs according to various embodiments of the present disclosure. As shown in FIG. 5, the process can include the following blocks.

Block 501: Sending the determined associated user IDs to a default network device, which is configured to record action behaviors corresponding to any user ID. Here, the default network device can be a machine or other realization forms, and is not limited.

Block 502: Receiving N user IDs returned by the network device, the N user IDs returned by the network device being particular user IDs which are selected by the network device from all the received associated user IDs and whose action behaviors meet a set condition.

The process as shown in FIG. 5 is completed.

Figure 6:
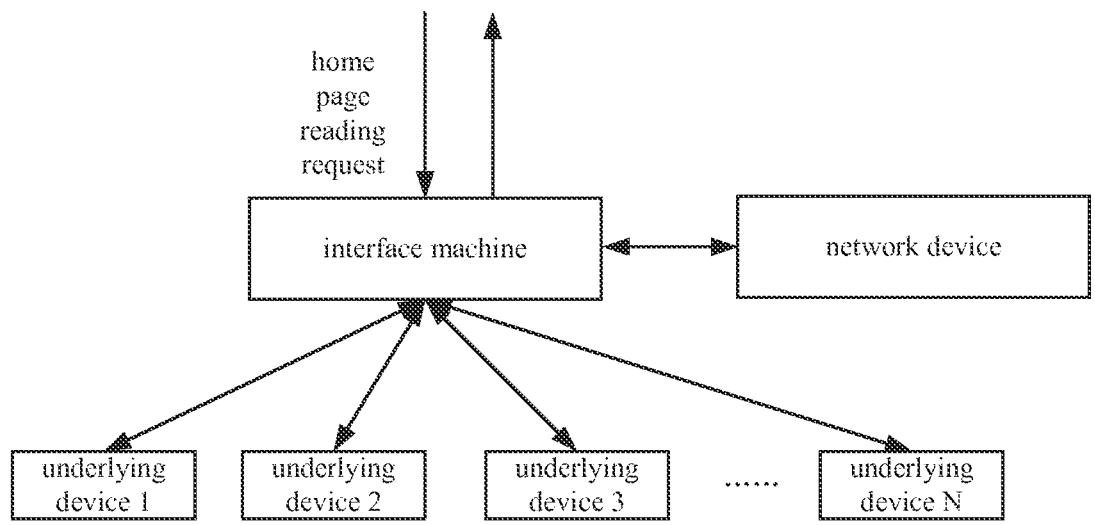
FIG. 6 shows a diagram of an application architecture according to various embodiments.

In order to facilitate the understanding of the processes of FIGS. 4-5, taking applying the data processing method in a microblogging application as an example in combination with the processes as shown in FIGS. 4-5, various embodiments of the present disclosure show application architecture. The details are shown in FIG. 6 and will not be repeated here.

In the present disclosure, the user data corresponding to the user ID are user-generated content (UGC). Based on this, the action behaviors corresponding to the user ID can be updating time or publishing time of the UGC. The action behaviors may meet a set condition that the updating time or the publishing time of the UGC is the latest.

According to various embodiments of the present disclosure, in actual implementations, the UGC can be a microblogging message. Based on this, in the above block 501, the action behaviors corresponding to the user ID at least include microblogging message publish time, and in block 502, the action behaviors meeting a set condition can include microblogging message publish time is latest.

Figure 7A:
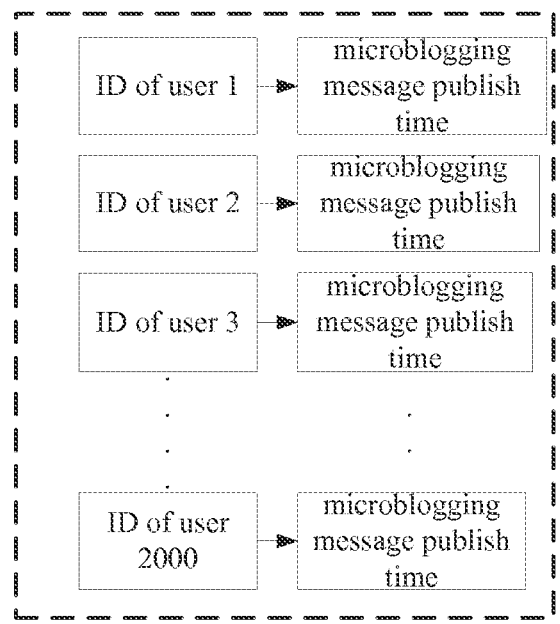
FIG. 7a shows a diagram of corresponding relationship between microblogging message publish time and microblogging user IDs according to various embodiments.
Figure 7B:
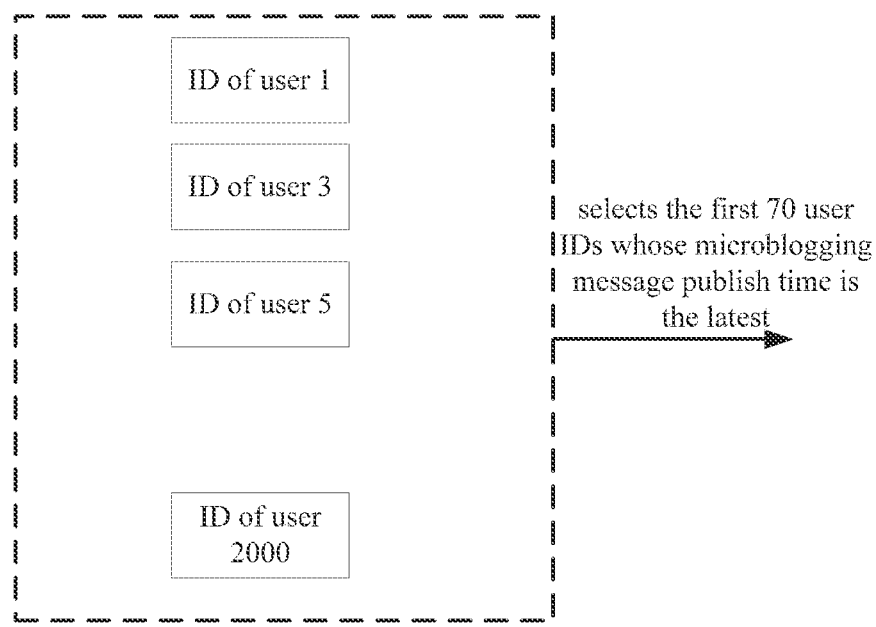
FIG. 7b is a diagram of a queue of the microblogging user IDs arranged according to the microblogging message publish time according to various embodiments.

Taking the UGC to be a microblogging message in an actual implementation as an example, the process as shown in FIG. 5 is described in following. In a microblogging application, one microblogging user ID has at most 2000 associated listening user IDs. Based on block 501 in the process as shown in FIG. 5, 2000 associated user IDs associated with one microblogging user ID can be sent to the default network device. After the default network device receives the 2000 user IDs, the default network device selects microblogging message publish time corresponding to the 2000 user IDs from the recorded user IDs, shown in FIG. 7a. The default network device then sequentially arranges the selected microblogging message publish time of the 2000 user IDs according to the microblogging message publish time, and the result of the arrangement is as shown in FIG. 7b. In FIG. 7b, one user ID whose microblogging message publish time is the latest is arranged at the top, and the others follow as so. Taking a value of N to be 70 as an example, the network device then selects the first 70 user IDs from the queue shown in FIG. 7b.

In the above description, the UGC as a microblogging message is just an example, and is not to limit the present disclosure. In the present disclosure, the UGC can also be a message published or updated by an instant messaging application space. Accordingly, in the above block 501, the action behaviors corresponding to the user ID at least include the instant messaging application space's message publishing or updating time, and in block 502, the action behaviors may meet a set condition that the updating time or the publishing time is the latest.

Figure 8:
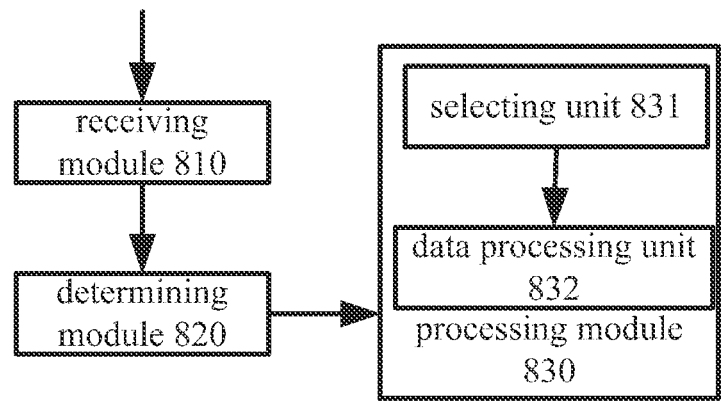
FIG. 8 is a diagram of a data processing apparatus according to various embodiments.

FIG. 8 is a diagram of a data processing apparatus according to various embodiments of the present disclosure. As shown in FIG. 8, the apparatus can include a receiving module 810, a determining module 820, and a processing module 830. The receiving module 810 is configured to receive a request which carries a user identifier (ID) from a user terminal. The determining module 820 is configured to determine all associated user IDs associated with the user ID.

The processing module 830 includes a selecting unit 831 and a data processing unit 832. The selecting unit 831 is configured to select N particular user IDs which meet a set condition from all the associated user IDs determined by the determining module. The data processing unit 832 is configured to pull the latest user data corresponding to the N particular user IDs and return the latest user data corresponding to the N particular user IDs to the user terminal. N is smaller than or equal to a user data amount M requested by a page.

In the present disclosure, the selecting unit 831 can select N particular user IDs which meet a set condition from all the associated user IDs determined by the determining module through the following:

sending all the associated user IDs to a default network device which is configured to record action behaviors corresponding to any user ID; and receiving N user IDs returned by the network device, the N user IDs returned by the network device being particular user IDs which are selected by the network device from all the received associated user IDs and whose action behaviors meet a set condition.

According to various embodiments of the present disclosure, the user data corresponding to the user ID are user-generated content (UGC). The action behaviors corresponding to the user ID can be updating time or publishing time of the UGC. The action behaviors meeting a set condition include updating time or publishing time of the UGC is the latest. According to various embodiments of the present disclosure, the UGC is a microblogging message or a message published by an instant messaging application space.

In the present disclosure, the data processing unit can pull the latest user data corresponding to the N particular user IDs through following operations:

determining underlying devices which manage the N particular user IDs from all the underlying devices (svr);

identifying a number L of the determined underlying devices, dividing the request into L request packets, and sending the L request packets to the L determined underling devices; each of the request packets carrying at least one of the N particular user IDs; and receiving user data returned by the L underlying devices; user data returned by each of the L underlying devices being the latest user data corresponding to particular user IDs carried in the request packet received by each of the L underlying devices. The apparatus shown in FIG. 8 is completed.

It can be seen from the above technical method that, in the present disclosure, when receiving the request from the user terminal, selecting N particular user IDs which meet the set condition from all the associated user IDs associated with the user, pulling latest user data corresponding to the N particular user IDs, and returning the latest user data corresponding to the N particular user IDs to the user terminal, N being smaller than or equal to the user data amount M requested by the page, compared with pulling latest user data corresponding to all the associated user IDs associated with the user, can save bandwidth resources and costs.

Figure 9:
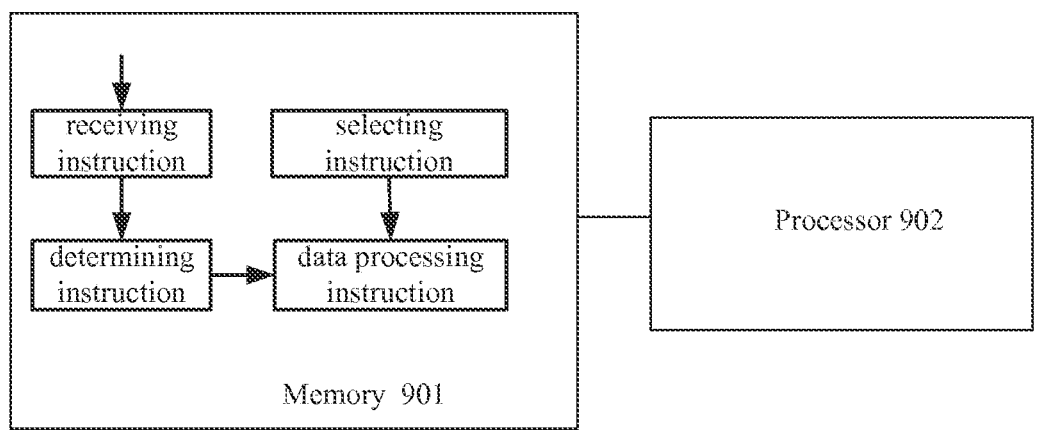
FIG. 9 is a diagram of a data processing apparatus according to various embodiments.

FIG. 9 is a diagram of a data processing apparatus according to various embodiments of the present disclosure. Referring to FIG. 9, the data processing apparatus may include a memory 901 and a processor 902. The memory 901 may be configured to store a receiving instruction, a determining instruction, a selecting instruction, and a data processing instruction. The processor 902 may be configured to communicate with the memory 901, execute the receiving instruction, the determining instruction, the selecting instruction, and the data processing instruction to respectively execute operations of the above receiving module, the determining module, the selecting unit, and the data processing unit.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

What has been described and illustrated herein are examples of the disclosure along with some variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A data processing method comprising:

receiving, from a user terminal by at least one processor of a server, a home page reading request for displaying on a home page of the user terminal latest microblogging messages associated with a user ID, the home page reading request including the user ID, and the home page having a maximum number of microblogging messages that are able to be displayed on the home page;

determining, by the at least one processor of the server, user IDs of all listening users of a user associated with the user ID based on a relationship chain of the user ID, as M associated user IDs; and determining, by the at least one processor of the server, N particular user IDs from among the M associated user IDs whose action behaviors satisfy a set condition, pulling, by the at least one processor of the server, only latest microblogging messages of the N particular user IDs, and returning, by the at least one processor of the server, only the latest microblogging messages to the user terminal for display on the home page of the user terminal, wherein N is less than M, where one microblogging message corresponds to one user ID, and where N is equal to the maximum number of microblogging messages that are able to be displayed on the home page;

wherein the pulling comprises:

determining a subset of underlying devices which manage messages of the N particular user IDs, from among a plurality of underlying devices, as L underlying devices;

determining, for each of the L underlying devices, which of the N particular user IDs are managed by the underlying device, each of the L underlying devices managing messages from at least two of the N particular user IDs;

dividing the home page reading request into L request packets, one request packet for each of the L underlying devices, and sending the L request packets only to corresponding ones of the L underlying devices, each of the L request packets including a request that requests the latest microblogging messages from two or more of the N particular user IDs;

receiving the latest microblogging messages of the N particular user IDs from the L underlying devices; and transmitting, to the user terminal by the at least one processor of the server, the latest microblogging messages from the L underlying devices.

2. The method of claim 1, wherein the determining the N particular user IDs comprises:

sending the user IDs of all the listening users to a default network device which is configured to record the action behaviors corresponding to any user ID; and receiving the N particular user IDs from the default network device.

3. The method of claim 2, wherein the action behaviors are updating or publishing of the microblogging messages; and the action behaviors meet the set condition when a time of updating or publishing of the microblogging message is among M latest.

4. The method of claim 3, wherein the microblogging message includes a message published by an instant messaging application space.

5. A non-transitory computer readable storage medium storing computer program code which, when executed by at least one processor of a server, performs operations comprising:

receiving, from a user terminal, a home page reading request for displaying on a home page of the user terminal latest microblogging messages associated with a user ID, the home page reading request including the user ID, and the home page having a maximum number of microblogging messages that are able to be displayed on the home page;

determining user IDs of all listening users of a user associated with the user ID based on a relationship chain of the user ID, as M associated user IDs; and determining N particular user IDs from among the M associated user IDs whose action behaviors satisfy a set condition, pulling only latest microblogging messages of the N particular user IDs, and returning only the latest microblogging messages to the user terminal for display on the home page of the user terminal, wherein N is less than M, where one microblogging message corresponds to one user ID, and where N is equal to the maximum number of microblogging messages that are able to be displayed on the home page;

wherein the pulling comprises:

determining a subset of underlying devices which manage messages of the N particular user IDs, from among a plurality of underlying devices, as L underlying devices;

determining, for each of the L underlying devices, which of the N particular user IDs are managed by the underlying device, each of the L underlying devices managing messages from at least two of the N particular user IDs;

dividing the home page reading request into L request packets, one request packet for each of the L underlying devices, and sending the L request packets only to corresponding ones of the L underlying devices, each of the L request packets including a request that requests the latest microblogging messages from two or more of the N particular user IDs;

receiving the latest microblogging messages of the N particular user IDs from the L underlying devices; and transmitting, to the user terminal, the latest microblogging messages from the L underlying devices.

6. The non-transitory computer readable storage medium of claim 5, wherein the determining the N particular user IDs comprises:

sending the user IDs of all the listening users to a default network device which is configured to record the action behaviors corresponding to any user ID; and receiving the N particular user IDs from the default network device.

7. The apparatus of claim 6, wherein the action behaviors are updating or publishing of the microblogging messages;

the action behaviors meet the set condition when a time of updating or publishing of the microblogging message is among M latest.

8. The apparatus of claim 7, wherein the microblogging message includes a message published by an instant messaging application space.

9. A data processing apparatus comprising a processor and a memory; wherein the processor and the memory are connected with each other via an internal bus; the memory stores computer program code for performing a data processing method, the computer program code when executed by the processor causes the processor to perform:

receiving, from a user terminal, a home page reading request for displaying on a home page of the user terminal latest microblogging messages associated with a user ID, the home page reading request including the user ID, and the home page having a maximum number of microblogging messages that are able to be displayed on the home page;

determining user IDs of all listening users of a user associated with the user ID based on a relationship chain of the user ID, as M associated user IDs; and determining N particular user IDs from among the M associated user IDs whose action behaviors satisfy a set condition, pulling only a latest microblogging message of each of the N particular user IDs, and returning only the latest microblogging messages to the user terminal for display on the home page of the user terminal, wherein N is less than M, where one microblogging message corresponds to one user ID, and where N is equal to the maximum number of microblogging messages that are able to be displayed on the home page;

wherein the pulling comprises:

determining a subset of underlying devices which manage messages of the N particular user IDs, from among a plurality of underlying devices, as L underlying devices;

determining, for each of the L underlying devices, which of the N particular user IDs are managed by the underlying device, each of the L underlying devices managing messages from at least two of the N particular user IDs;

dividing the home page reading request into L request packets, one request packet for each of the L underlying devices, and sending the L request packets only to corresponding ones of the L underlying devices, at least one of the L request packets including a request that requests the latest microblogging messages from two or more of the N particular user IDs;

receiving the latest microblogging messages from the L underlying devices; and transmitting, to the user terminal, the latest microblogging messages from the L underlying devices.

10. The method of claim 1, wherein the set condition is that an updating time or a publishing time of the microblogging message is a latest time.

11. The method of claim 1, wherein the at least one processor of the server transmits to the user terminal the latest microblogging messages from the L underlying devices in response to only a single home page reading request.

* * * * *